United States Patent
Planka

(10) Patent No.: US 7,130,309 B2
(45) Date of Patent: Oct. 31, 2006

(54) COMMUNICATION DEVICE WITH DYNAMIC DELAY COMPENSATION AND METHOD FOR COMMUNICATING VOICE OVER A PACKET-SWITCHED NETWORK

(75) Inventor: Boaz Planka, Kohav Yair (IL)

(73) Assignee: Intel Corporation, Santa Clara, CA (US)

( * ) Notice: Subject to any disclaimer, the term of this patent is extended or adjusted under 35 U.S.C. 154(b) by 952 days.

(21) Appl. No.: 10/081,307

(22) Filed: Feb. 20, 2002

(65) Prior Publication Data

US 2003/0156601 A1 Aug. 21, 2003

(51) Int. Cl.
*H04J 3/17* (2006.01)

(52) U.S. Cl. .................. 370/435; 370/329; 370/521; 704/201; 704/500; 455/452.1

(58) Field of Classification Search ............. 370/433, 370/435; 704/241, 201
See application file for complete search history.

(56) References Cited

U.S. PATENT DOCUMENTS

| | | | | |
|---|---|---|---|---|
| 4,100,377 A * | 7/1978 | Flanagan | ............. | 370/435 |
| 5,216,744 A * | 6/1993 | Alleyne et al. | ............. | 704/200 |
| 5,386,493 A * | 1/1995 | Degen et al. | ............. | 704/267 |
| 5,398,072 A * | 3/1995 | Auld | ............. | 375/240.25 |
| 5,555,447 A * | 9/1996 | Kotzin et al. | ............. | 455/72 |
| 5,566,208 A * | 10/1996 | Balakrishnan | ............. | 375/240 |
| 5,699,404 A * | 12/1997 | Satyamurti et al. | ............. | 340/7.28 |
| 5,862,178 A * | 1/1999 | Jarvinen et al. | ............. | 375/240 |
| 5,878,120 A * | 3/1999 | O'Mahony | ............. | 379/93.09 |
| 6,229,802 B1 * | 5/2001 | Hippelainen | ............. | 370/349 |
| 6,373,842 B1 * | 4/2002 | Coverdale et al. | ............. | 370/394 |
| 6,594,628 B1 * | 7/2003 | Jacobs et al. | ............. | 704/231 |
| 6,661,846 B1 * | 12/2003 | Ota | ............. | 375/240.28 |
| 7,016,850 B1 * | 3/2006 | Cox et al. | ............. | 704/503 |
| 2004/0042506 A1 * | 3/2004 | Fallon et al. | ............. | 370/521 |
| 2005/0031097 A1 * | 2/2005 | Rabenko et al. | ............. | 379/93.31 |
| 2005/0060153 A1 * | 3/2005 | Gable et al. | ............. | 704/246 |
| 2005/0141463 A1 * | 6/2005 | Ando | ............. | 370/335 |
| 2005/0207388 A1 * | 9/2005 | Rinne et al. | ............. | 370/347 |

* cited by examiner

*Primary Examiner*—Hassan Kizou
*Assistant Examiner*—Mohammad S. Adhami
(74) *Attorney, Agent, or Firm*—Schwegman, Lundberg, Woessner & Kluth, P.A.

(57) ABSTRACT

A device and method for communication of speech packets over a packet-switched network allows for a greater channel reallocation delay. Initial speech packets may be buffered during a channel reallocation delay and sent through an access medium when a channel is granted. A media access controller may transmit the buffered speech packets through the access medium at a rate exceeding a speech encoding rate. At the receiving user equipment, the initial speech packets are decoded and buffered. Speech signals representative of the initial speech packets may have a shortened time period to compensate at least in part for the channel reallocation delay. Decoded speech packets may be processed using a rate matching process at a rate which initially exceeds the speech encoding rate which may be gradually decreased to approximately the speech encoding rate. The rate matching may include dynamic time warping to substantially preserve attributes of the original speech.

28 Claims, 4 Drawing Sheets

COMMUNICATION DEVICE WITH DYNAMIC DELAY COMPENSATION AND METHOD FOR COMMUNICATING VOICE OVER A PACKET-SWITCHED NETWORK

FIELD OF THE INVENTION

The present invention pertains to the communication of voice over a packet-switched network.

BACKGROUND OF THE INVENTION

As an alternative to traditional circuit-switched networks, voice communications, for example, may be routed over packet-switched networks like the Internet. Due to the fact that the Internet is not subject to the same international regulations as are traditional telephone networks, routing voice communications over the Internet tends to be less expensive. Additionally, a voice communication routed over a packet-switched network may require less bandwidth than a voice communication placed over a circuit-switched network like a traditional telephone network. Packet-switched networks like the internet protocol (IP)-based Internet, Intranets, and Asynchronous Transfer Mode (ATM) networks handle bursty data more efficiently than circuit-switched networks because of statistical multiplexing of the packet streams. However, statistical variations of traffic intensity often lead to congestion that results in excessive delays and loss of packets, thereby significantly reducing the quality level of real-time voice communications.

One problem with sending packetized voice over packet-switched networks are the delays associated with channel reallocation. Packet delays above a certain level (e.g., 100–300 mS) are generally found to be annoying for voice conversations. As a result, some networks supporting Voice-over-Packet (VoP) impose a maximum delay requirement of 100 milliseconds (mS). One critical point in the design for such a requirement is the onset of a speech spurt (i.e., when a user starts to speak after a pause or delay) when speech packets are initially generated. Unlike conventional circuit-switched networks, packet-switched networks may not have a dedicated channel ready and available to immediately transfer the packet stream. In conventional packet-switched networks, a media access control device may be employed to reallocate an existing channel and grant access to the channel for the voice packet stream. This channel allocation/reallocation process involves signaling between the various network elements and takes time that can easily exceed an acceptable delay for voice communications as well as the maximum delay requirement imposed on a packet-switched network for voice communication. The channel allocation/reallocation time may become significant especially when existing packet streams have at least as great of a quality of service requirement which may prevent reallocation of their channels. Packet-switched networks have employed partial loading of the access medium (e.g., by reserving a channel) to always allow some capacity for the initial speech onset to meet delay requirements. However partial loading consumes bandwidth because the reserved capacity is unused when no speech packets are being transferred.

Thus there is a general need for an improved method and system for the communication of voice over a packet-switched network. There is also a need for a method and system for communicating voice over a packet-switched network that more efficiently utilizes network resources. There is also a need for a method and system for communicating voice over a packet-switched network that may increase network capacity.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

DETAILED DESCRIPTION

Figure 1:
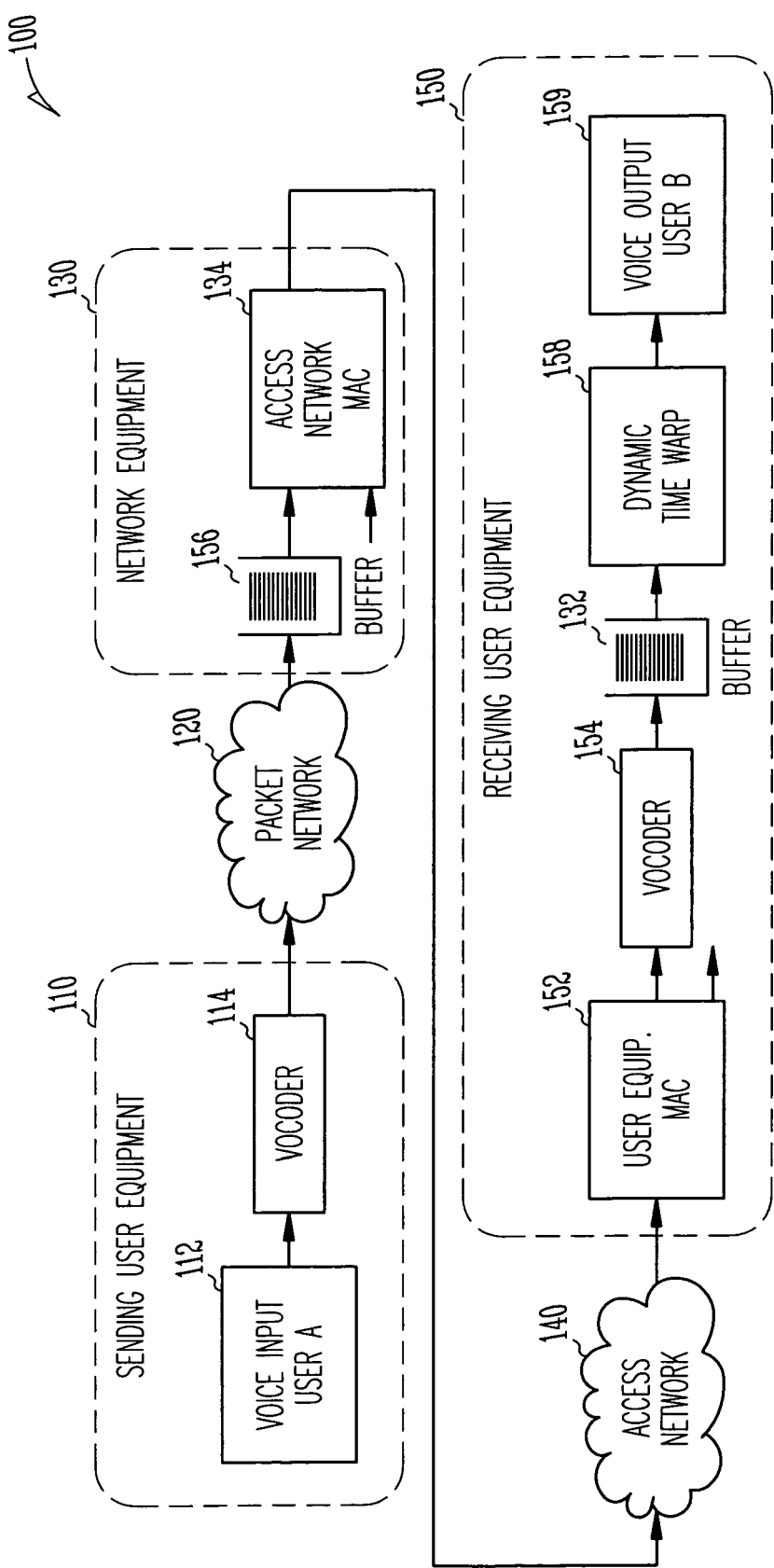
FIG. 1 is a functional block diagram of a system for communicating speech packets in accordance with an embodiment of the present invention.

The description set out herein illustrates the various embodiments of the invention and such description is not intended to be construed as limiting in any manner. FIG. 1 is a functional block diagram of a system for communicating speech packets in accordance with an embodiment of the present invention. System 100 provides for the communication of speech packets from sending user equipment 110 to receiving user equipment 150. Sending user equipment 110 may be any device that generates a stream of packetized speech and may be a wireline digital telephone, a computer, etc. Voice input element 112 digitizes a user's speech and supplies digitized speech samples to vocoder 114. Vocoder 114 may be a voice encoder that encodes the speech samples in accordance with one or more speech encoding techniques to generate a packet stream of speech packets at a speech encoding rate. This packet stream may be sent over packet network 120. Packet network 120 may be an internet protocol (IP) network or any network suitable for the transfer of packetized communications such as the internet, an intranet, or a local area network, and may even include the public switched telephone network. Sending user equipment 110 may add information to the speech packets such as source and destination addressing for transfer of the speech packets through network 120. Sending user equipment 110 may also perform other operations on the speech packets including encryption. Packet network 120 may transfer the speech packets from sending user equipment 110 to network equipment 130 at the speech encoding rate without significant delay. In other words, whenever vocoder 114 generates encoded speech packets, the packet stream may be quickly transferred through packet network 120. Other sending user equipment (not shown) may be coupled with packet network 120 and may use packet network 120 for communications. In one alternate embodiment, sending user equipment 110 may send the speech packets directly to network equipment 130 at the speech encoding rate. In this embodiment, packet network 120 does not need to be utilized.

Network equipment 130 interfaces between packet network 120 and access network 140. In the alternate embodiment, network equipment 130 interfaces between sending user equipment 110 and access network 140. Access network 140 may be a packet-switched network comprised of a communication medium that may provide for communication channels of various bandwidths. The communication channels may be reserved or dedicated, or may be reallocated upon request. Examples of access media suitable for access network 140 include optical media, wireline media, the airwaves (i.e., wireless), and combinations thereof including, for example, fiber optical networks, hybrid fiber coaxial (HFC) networks, and coaxial cable networks. When access network 140 is a wireless network, spread-spectrum multiplexing, frequency-division multiplexing, time-division multiplexing, and combinations thereof may be implemented by media access controller (MAC) 134 for communications through the airwaves. When access network 140 is a fiber optical network, wavelength-division multiplexing, frequency-division multiplexing, or time-division multiplexing, for example, may be implemented by MAC 134 for communicating through the access medium.

Upon receipt of the initial encoded speech packets from user equipment 110, network equipment 130 buffers the packets in buffer 132 while MAC 134 may reallocate (or allocate) a channel through access network 140 to receiving user equipment 150. The encoded speech packets are buffered for a channel reallocation delay which may, for example, require up to one second or greater. Although a delay, for example, of greater than 100 ms for voice communications may be considered unacceptable, adaptive processing by receiving user equipment 150 compensates for this delay. During the channel reallocation delay, MAC 134 and user equipment 150 may perform signaling in accordance with one or more protocols to determine the communication parameters of the channel. Prior to reallocation, the channel may have been used for the communication of other data streams. When an access channel is reallocated, MAC 134 sends the buffered speech packets through the channel at a packet transfer rate that exceeds the speech encoding rate. The access channel, at least initially, has a greater bandwidth than required for transfer of the speech packets at the speech encoding rate. In accordance with one embodiment of the present invention, the rate at which the buffered speech packets are transferred through the access channel significantly exceeds the speech encoding rate. The buffered packets may be transferred very quickly.

Reallocation as used herein, includes assigning or reassigning a portion of the spectrum through an access medium for a particular packet stream. In addition to signaling time, MAC 134 may, for example, have to wait for packet streams having higher quality of service requirements (e.g., less delay being allowed) before a channel is reallocated.

MAC 134 may also track a time stamp associated with each speech packet being buffered (e.g., using a real time transport protocol (RTP)) and may notify receiving user equipment 150 of the time difference between the buffered packets once the access channel is allocated. MAC 134 may also dump the oldest packets from the buffer when the time difference exceeds a predetermined time.

User equipment MAC 152 receives the buffered speech packets sent by MAC 134 at the packet transfer rate. User equipment MAC 152 may also receive the time difference between the buffered packets from MAC 134. Vocoder 154 may be a voice decoder that decodes speech packets. Vocoder 154 may decode the speech packets at a rate which is a higher rate than the speech encoding rate, and may decode the speech packets at the packet transfer rate. Vocoder 154 buffers the decoded speech packets in buffer 156. The decoded speech packets substantially correspond with the initial portion of speech packets generated by voice input element 112 of sending user equipment 110 prior to voice encoding. User equipment MAC 152 may also receive other packetized communications (such as data or video for example) through network 140 and may provide these other communications to other elements (not shown) of user equipment 150. MAC 152 may comprise a transceiver and/or demultiplexer depending on the particular access medium for which equipment 150 is designed for.

Processing element 158 processes the decoded speech packets from buffer 156 to generate speech signals representative of at least the initial portion of the speech packets. The generated speech signals have a shortened time period to compensate for the channel allocation delay. In one embodiment, processing element 158 may process the decoded speech packets from buffer 156 at a varying rate which may initially exceed the speech encoding rate. The processing rate may be gradually decreased to approximately the speech encoding rate. The varying rate at which processing element processes the speech packets may be initially inversely proportional to the time difference between the buffered packets. Processing element 158 may use the time difference provided by MAC 134 to determine the rate of processing the buffered speech packets. Buffer 156 may act as a "leaky bucket" initially emptying the speech packets at a higher rate and gradually tapering off to a lower rate which eventually approximates the input rate (e.g., the speech encoding rate) for subsequent portions of the speech segment.

Processing element 158 may use a rate matching process and may include a dynamic time warping (DTW) process to dynamically time warp the speech packets from buffer 156 from an initial rate to approximately the speech encoding rate while substantially preserving attributes of the original speech, such as pitch, for example. In a DTW process, portions of two patterns may be compared and are brought into time alignment. The DTW process may shift portions of a speech waveform along the time axis to find a match with another waveform. The splicing points of the shifted portion may be smoothed with a filter.

To illustrate the operation of an embodiment of the present invention, consider a channel access delay of one second in which one second's worth of encoded speech packets are buffered in buffer 132. Once a channel is allocated, the one second's worth of encoded speech packets may be transferred through network 140 to user equipment 150 at a high rate, decoded at a high rate and stored in buffer 154. Subsequent speech packets (let's say three seconds worth, for example) may be sent through the channel at the speech encoding rate. Processing element 158 may generate voice signals over the next three seconds, for example, that include the next three seconds worth of speech along with the initial one second's worth of buffered speech packets. Accordingly, in this example, four seconds worth of speech is provided to the user over a period of three seconds. A DTW process may, for example, preserve the pitch of the speech segment. From the recipient's perspective, the speech may sound like the sender is speaking slightly more quickly.

Receiving user equipment 150 may be any user equipment or device for receiving information from access network 140. Receiving user equipment 150 may include communication devices such as wireline and wireless telephones, data terminals, portable computers, etc. For simplicity, not all functional elements of receiving user equipment 150 are illustrated in FIG. 1. One or more functional element of user equipment 150 may be implemented in a digital signal processor (DSP).

Figure 2:
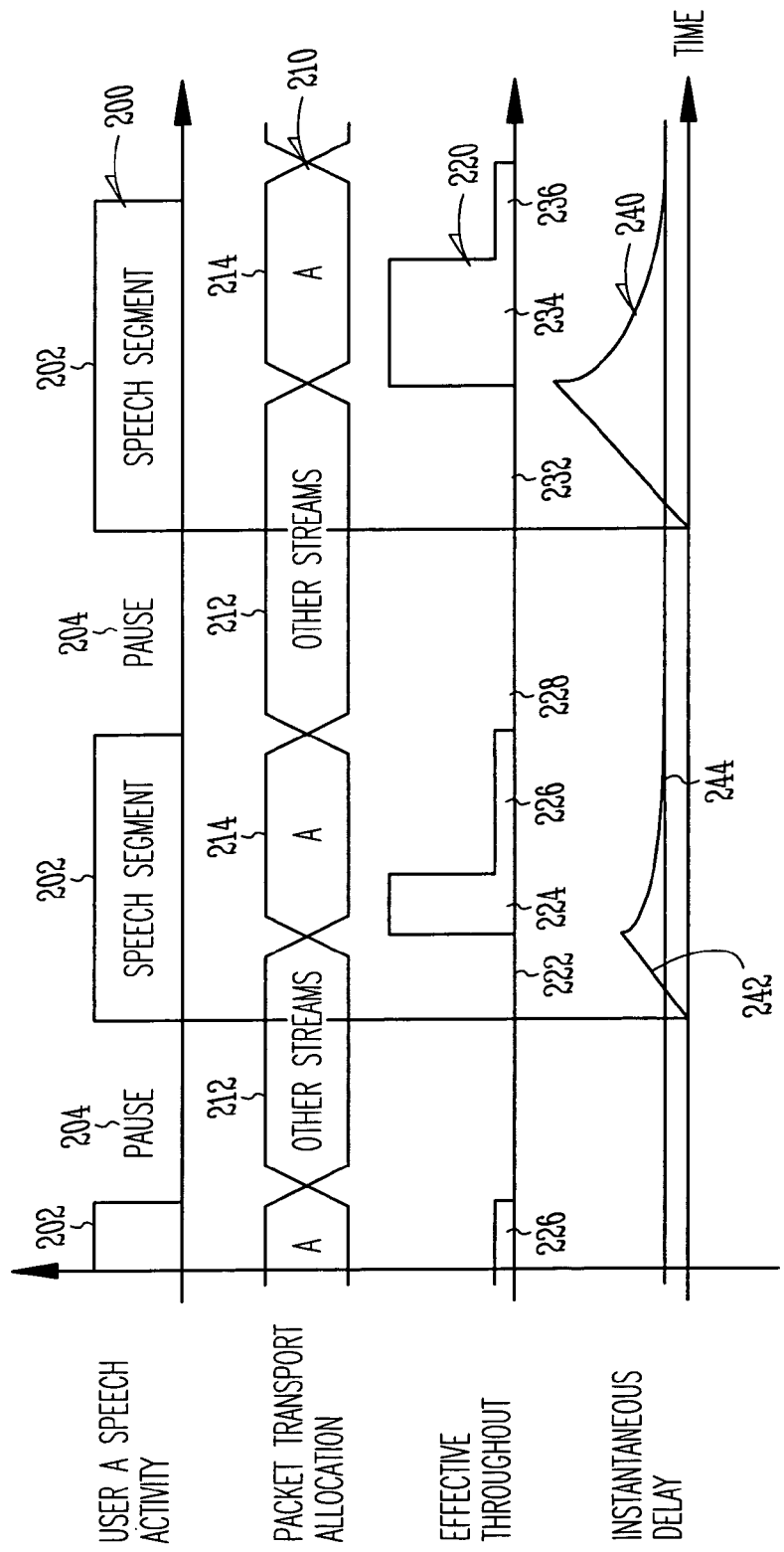
FIG. 2 illustrates the operation of the system of FIG. 1 in accordance with an embodiment of the present invention.

FIG. 2 illustrates the operation of the system of FIG. 1 in accordance with an embodiment of the present invention. Item 200 illustrates a user's speech activity which may be comprised of a series of speech segments 202 separated by pauses 204. In reference to FIG. 1, encoded speech packets may be generated by sending user equipment 110 for speech segments 202 and may refrain from generating encoding speech packets during pauses 204. Item 210 illustrates the packet transport allocation through an access medium for the user's speech activity in accordance with an embodiment of the present invention. A channel is allocated to other packet streams during time periods 212, while during time periods 214, a channel is allocated for the communication of the speech packets that comprise speech segment 202. A channel allocation delay is illustrated between the start of one of speech segments 202 and the beginning of time period 214, however little or no delay is illustrated from the completion of speech segments 202 and the reallocation of the channel back to other streams during time periods 212. In other words, less time is required to send entire speech segment 202 through the access medium than the time it took to encode the speech segment.

Item 220 illustrates the effective throughput of the allocated channel through the access medium for communicating the speech packets in accordance with an embodiment of the present invention. During time 222, there is no throughput because no channel for the speech segment has been allocated. During time 224, the channel has been allocated and the initial speech packets of the speech segment that have been buffered are transferred at a high rate through the access medium. During time 226, the buffered packets may have all been transferred and packet transfer rate through the access medium will approximate the speech encoding rate. Speech packets will continue at this rate until a pause occurs, at which time the channel is reallocated to other streams and the transfer rate goes to zero during time 228.

Item 220 also illustrates channel allocation delay time 232 which is illustrated as being greater than channel allocation delay time 222. As a result of a longer channel allocation delay, more speech packets are buffered and may require a longer time 234 to transfer the packets through the access medium and empty the buffer. Once the buffer is emptied, the packet transfer rate will again approach the speech encoding rate during time 236.

In one embodiment of the present invention, the rate at which the buffered speech packets are transferred through the access medium may be a predetermined rate which exceeds the speech encoding rate, or may be a maximum rate for the channel. In an alternate embodiment of the present invention, the transfer rate of the buffered speech packets may be variable (i.e., greater when there are more buffered speech packets to transfer).

Item 240 illustrates an instantaneous effective delay from the recipients perspective in accordance with an embodiment of the present invention. The delay grows during time 242 until the channel is allocated and the buffered speech packets are sent. Once a channel is reallocated and the initial packets are sent, the time delay decreases and eventually levels off at the physical delay after time 244. In other words, the initial delay due to channel allocation is gradually eliminated.

Figure 3:
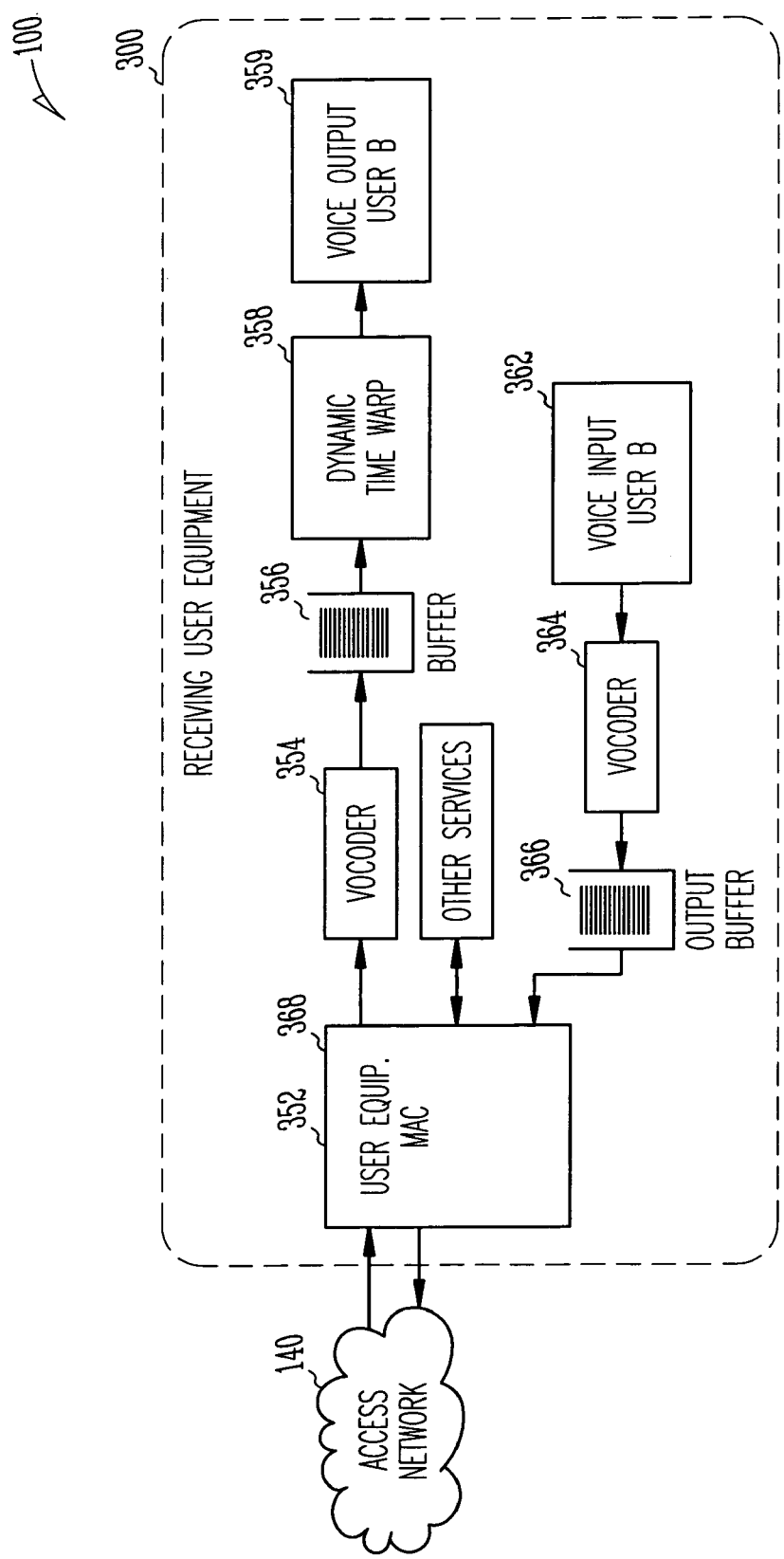
FIG. 3 is a functional block diagram of user equipment in accordance with another embodiment of the present invention.

FIG. 3 is a functional block diagram of user equipment in accordance with another embodiment of the present invention. User equipment 300 may be similar to user equipment 100 (FIG. 1) but user equipment 300 illustrates additional functional elements for the transmission of speech packets through an access medium as well as reception of speech packets. User equipment 300 may operate as a two-way communication device for communication of at least voice. Elements 352, 354, 356, 358 and 359 correspond respectively with and provide similar functionality as elements 152, 154, 156, 158 and 159 of user equipment 150 (FIG. 1). Elements 362, 364, 366 and 368 may provide similar functionality as elements 112, 114, 132 and 134 respectively of FIG. 1. Voice input element 362 and voice output element 359 may be combined in one element, and user equipment MAC 352, 368 may be one or more functional elements.

In addition to the functionality of user equipment 150 (FIG. 1), user equipment 300 buffers encoded speech packets until an access channel is granted and MAC 368 transfers the buffered speech packet through access network 140 at a rate higher than the speech encoding rate. MAC 368, rather than reallocating a channel, may send a request to a MAC associated with access network 140 requesting allocation/reallocation of a channel. In one embodiment, vocoders 356 and 364 may be implemented together to encode and decode speech packets. One or more functional element of user equipment 300 may be implemented in a DSP.

Figure 4:
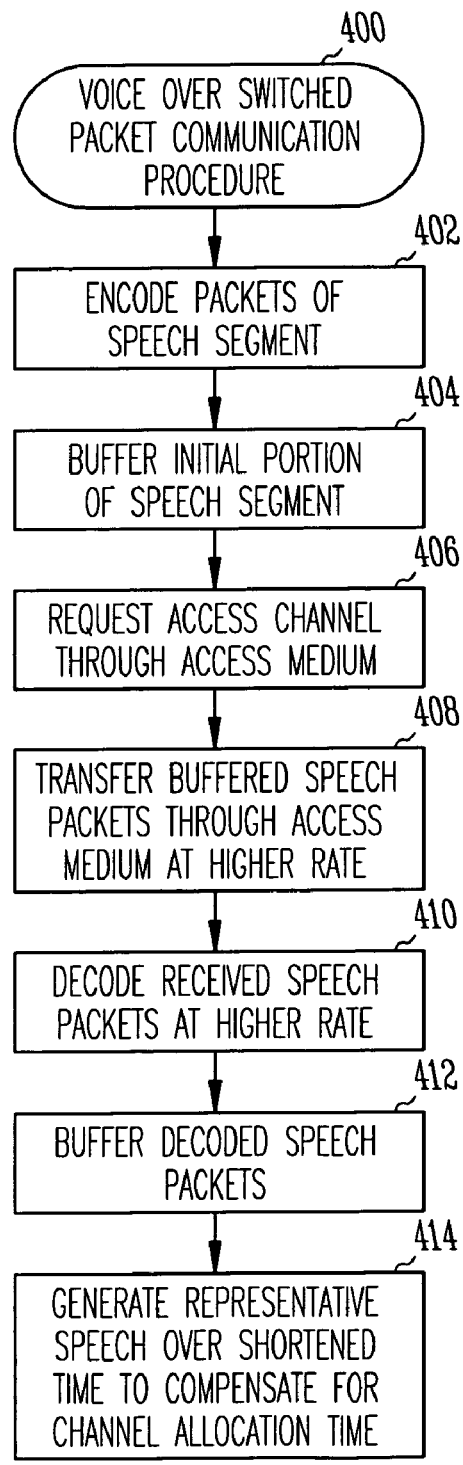
FIG. 4 is a flow chart of a voice over packet communication procedure in accordance with an embodiment of the present invention.
Figure 1:
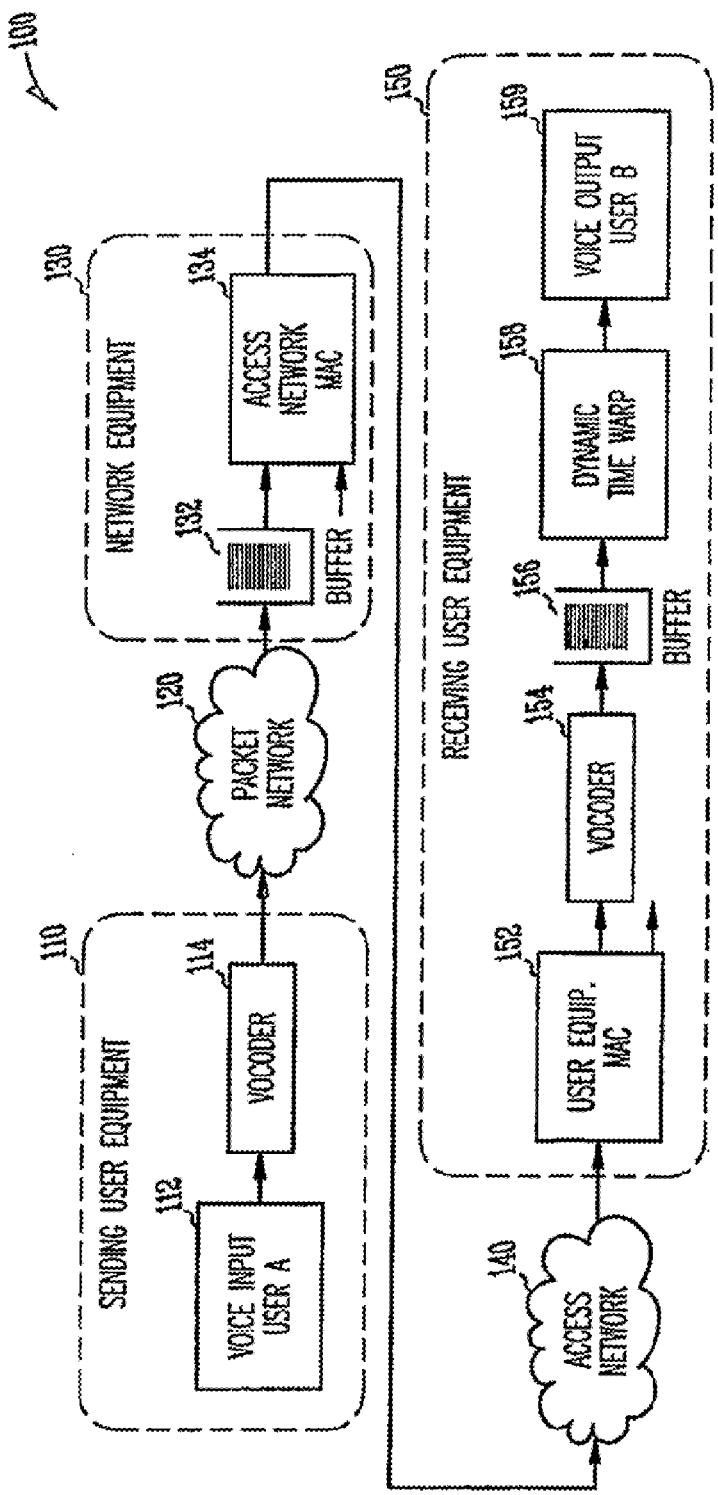

FIG. 4 is a flow chart of a voice over packet communication procedure in accordance with an embodiment of the present invention. Procedure 400 may be performed, for example, by the elements of system 100 (FIG. 1), or may be performed by user equipment 300 (FIG. 3), however other equipment may also be suitable. Procedure 400 provides for the communication of speech packets through a packet-switched network and compensates for channel allocation delays that may, for example, exceed delays acceptable in voice conversation. In operation 402, speech segments are encoded to generate encoded speech packets at a speech encoding rate. The encoded speech packets may be in the form of a packet stream and may traverse a packet network at substantially the speech encoding rate. In operation 404, an initial portion of the encoded speech packets of the speech segment are buffered for a channel allocation delay. Upon the receipt of the initial encoded speech packets, operation 406 requests allocation of a channel through an access medium. When the channel is allocated, operation 408 transfers the buffered speech packets through the access medium at a rate exceeding the speech encoding rate.

In operation 410, the speech packets may be decoded at a rate greater than the speech encoding rate which may be at substantially the rate at which they were transferred through the access medium. The decoded packets are buffered in operation 412 and operation 414 generates speech signals over a shorted time to compensate for the channel allocation delay time.

In one embodiment, operation 414 may process the decoded speech packets from a buffer at a varying rate which initially exceeds the speech encoding rate. The rate may be gradually decreased to approximately the speech encoding rate. The varying rate at which the buffered speech packets are processed may be initially inversely proportional to the time difference between the buffered packets. A buffer may be initially emptied at a higher rate and gradually tapering off to a lower rate which may approximate the input rate. Operation 414 may use a rate matching process and may include a dynamic time warping (DTW) process to dynamically time warp the speech packets from a buffer, such as buffer 156 (FIG. 1) from an initially higher rate to approximately the speech encoding rate while substantially preserving attributes of the original speech, such as pitch, for example.

Although the individual operations of procedure 400 are illustrated and described as separate operations, it should be noted that one or more of the individual operations may be performed concurrently. Further, nothing necessarily requires that the operations be performed in the order illustrated. Operation 402 may be performed, for example, by sending user equipment 110 (FIG. 1). Operations 404 through 408 may be performed, for example, by network equipment 130 (FIG. 1). Operations 410 through 414 may be performed, for example, by receiving user equipment 150 (FIG. 1). Operations 402 through 414 may also be performed, for example, by user equipment 300 (FIG. 3).

Thus, a method and system for the communication of voice over a packet-switched network has been described. The system and method allow for an increase in channel allocation time beyond a time delay that is acceptable for voice conversations. In one embodiment, a method and system for the communication of speech packets over a packet-switched network is provided. The system and method allow for an increase in channel reallocation time beyond a time delay that is acceptable for voice conversations, and may provide for an increase in the capacity of an access network. Initial speech packets may be buffered during a channel reallocation delay and sent through an access medium when a channel is granted. A media access controller may transmit the buffered speech packets through the access medium at a rate exceeding a speech encoding rate. At the receiving user equipment, the initial speech packets received through the access medium may be decoded and buffered. The receiving user equipment may generate speech signals representative of the initial speech packets and may have a shortened time period to compensate for the channel reallocation delay. In one embodiment, decoded speech packets are processed using a rate matching process having a varying processing rate which initially exceeds the speech encoding rate and is gradually decreased to approximately the speech encoding rate. A dynamic time warping process may be used to implement rate matching and substantially preserve at least some attributes of the original speech.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments. It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of receiving packet-switched voice communications over a non-dedicated wireless communication channel comprising:
    receiving at least an initial portion of speech packets at a transmission rate exceeding a speech encoding rate;
    decoding the speech packets at a rate exceeding the speech encoding rate; and
    generating speech signals from the decoded speech packets at a varying rate, the speech signals being representative of the initial portion of speech packets and having a shortened time period which at least in part compensates for a channel reallocation delay,
    wherein generating the speech signals at the varying rate comprises:
        initially generating speech signals at a rate exceeding the speech encoding rate; and
        decreasing the rate of generating the speech signals to approximately the speech encoding rate.

2. The method of claim 1 wherein the varying rate initially exceeds the speech encoding rate and decreased gradually to approximately the speech encoding rate, and
    wherein the varying rate of generating speech signals is initially greater than the speech encoding rate to compensate at least in part for the channel reallocation delay.

3. The method of claim 1 further comprising buffering the decoded speech packets in a buffer, and
    wherein generating includes retrieving the decoded speech packets from the buffer at the varying rate which initially exceeds the speech encoding rate, the varying rate being gradually decreased to approximately the speech encoding rate.

4. The method of claim 1 wherein processing generating includes processing the decoded speech packets with a dynamic time warping process to generate speech signals representative of the initial portion of speech packets, the generated speech signals spanning a shorter time duration than the initial portion of speech packets and having substantially preserved pitch attributes of the initial portion of speech packets, and
    wherein the dynamic time warping process compensates for an increased pitch resulting from initially generating the speech signals at the rate exceeding the speech encoding rate.

5. The method of claim 1 wherein the decoding is performed at approximately the transmission rate.

6. The method of claim 1 wherein the initial portion of speech packets is buffered for the channel reallocation delay until a wireless communication channel through a wireless access medium is granted, and
    wherein the initial portion of speech packets is sent in response to the channel being granted.

7. The method of claim 6 wherein the wireless communication channel has a channel bandwidth that is approximately proportional to an inverse of the channel reallocation delay.

8. The method of claim 2 wherein the speech packets are received through a wireless access medium.

9. The method of claim 1 wherein the speech signals correspond to actual audio signals that are to be heard by a person listening.

10. The method of claim 8 wherein the wireless access medium employs, at least one of spread-spectrum multiplexing, frequency-division multiplexing or time-division multiplexing.

11. A wireless communication device for communicating packet-switched voice communications comprising:
    a voice decoder to decode speech packets, at least an initial portion of the speech packets being delayed by a channel reallocation delay;
    a buffer to store the decoded speech packets; and
    a processing element to generate speech signals from the decoded speech packets at a varying rate initially exceeding a speech encoding rate to compensate at least in part for the channel relocation delay, wherein the speech signals are representative of the initial portion of the speech packets and have, a shortened time period,
    wherein the processing element decreases the rate of generating the speech signals to approximately the speech encoding rate.

12. The wireless communication device of claim 11 wherein the communication device receives the initial portion of the speech packets at a rate exceeding the speech encoding rate, and the voice decoder decodes the initial portion of the speech packets at a rate exceeding the speech encoding rate.

13. The wireless communication device of claim 11 wherein the initial portion of the speech packets are buffered for a time approximating the channel reallocation delay prior to transmission through an access medium, wherein the channel reallocation delay includes time to grant a channel through the access medium.

14. The communication device of claim 11 wherein the processing element processes the decoded speech packets at a processing rate which initially exceeds the speech encoding rate and which is gradually decreased to approximately the speech encoding rate.

15. The wireless communication device of claim 11 wherein the processing element retrieves the decoded speech packets from the buffer at a rate which initially exceeds the speech encoding rate to initially generate the speech signals at a rate exceeding the speech encoding rate, and
wherein the processing element gradually decreases the rate of generating the speech signals to approximately the speech encoding rate.

16. The wireless communication device of claim 11 wherein processing element processes the decoded speech packets with a dynamic time warping process to generate speech signals representative of the initial portion of the speech packets, the speech signals spanning a shorter time duration than the initial portion of the speech packets and having substantially preserved pitch attributes of the initial portion of the speech packets, and
wherein the dynamic time warping process compensates for an increased pitch resulting from initially generating the speech signals at the rate exceeding the speech encoding rate.

17. The wireless communication device of claim 11 wherein the communication device receives the initial portion of the speech packets at a transmission rate and the voice decoder performs the decoding at approximately the transmission rate.

18. The wireless communication device of claim 11 wherein the speech packets are received through a wireless communication channel that is granted through a wireless access medium, and
wherein the speech packets are buffered during the channel reallocation delay until the wireless communication channel is granted.

19. The wireless communication device of claim 18 wherein the wireless communication channel has a bandwidth that is is approximately proportional to an inverse of the channel reallocation delay.

20. The wireless communication device of claim 12 wherein the speech packets are received through a wireless access medium.

21. The wireless communication device of claim 11 wherein the speech signals correspond to actual audio signals that are to be heard by a person listening.

22. The wireless communication device of claim 20 wherein the wireless communication medium employs at least one of spread spectrum multiplexed, frequency division multiplexed or time division multiplexed communication signals.

23. A system for communicating voice over a wireless communication channel comprising:
a voice encoder to encode outbound speech packets at a speech encoding rate;
an output buffer to store the encoded outbound speech packets until a wireless communication channel is allocated for the transmission of the encoded outbound speech packets;
a voice decoder to decode speech packets received through the wireless communication channel, at least an initial portion of the speech packets being delayed by a channel reallocation delay;
a decoder buffer to store the decoded speech packets; and
a processing element to generate speech signals from the decoded speech packets at a varying rate initially exceeding the speech encoding rate to compensate for a channel allocation delay, and to decrease the varying rate to the speech encoding rate, wherein the speech signals are representative of at least the initial portion of the speech packets and have a shortened time period which compensates for the channel allocation delay.

24. The system of claim 23 wherein the speech signals correspond to actual audio signals that are to be heard by a person listening.

25. The system of claim 24 further comprising a media access controller to receive inbound speech packets from a wireless access medium, to transfer outbound speech packets to the access medium and to request allocation of the wireless communication channel for transmission of the outbound speech packets through the wireless access medium.

26. The system of claim 25 wherein the media access controller sends the outbound speech packets through the wireless access medium at a rate exceeding the speech encoding rate, and
wherein the processing element processes the decoded inbound speech packets to generate the speech signals at a rate which initially exceeds the speech encoding rate and which is gradually decreased to approximately the speech encoding rate.

27. The system of claim 26 wherein processing element processes the decoded inbound speech packets with a dynamic time warping process to generate speech signals representative of the initial portion of the inbound speech packets, the speech signals spanning a shorter time duration than the initial portion of the inbound speech packets and having substantially preserved pitch attributes of the initial portion of the inbound speech packets, and
wherein the dynamic time warping compensates for an increased pitch resulting from initially generating the speech signals at the rate exceeding the speech encoding rate.

28. The system of claim 23 wherein the voice decoder, the decoder buffer, and the processing element are part of a wireless communication device, and
wherein the voice encoder and the output buffer are part of a transmitting wireless communication device.

* * * * *

UNITED STATES PATENT AND TRADEMARK OFFICE
CERTIFICATE OF CORRECTION

PATENT NO.         : 7,130,309 B2
APPLICATION NO. : 10/081307
DATED                : October 31, 2006
INVENTOR(S)       : Pianka It is certified that error appears in the above-identified patent and that said Letters Patent is hereby corrected as shown below:

On the face page, in field (75), in "Inventor", in column 1, line 1, delete "Planka" and insert -- Pianka --, therefor.

On the face page, in field (56), under "U.S. Patent Documents", in column 2, line 8, delete "379/93.31" and insert -- 379/093.31 --, therefor.

On sheet 1 of 4, in fig. 1, delete "156" and insert -- 132 --, therefor.

On sheet 1 of 4, in fig. 1, delete "132" and insert -- 156 --, therefor.

In column 8, line 6, in Claim 2, after "and" insert -- is --.

In column 8, line 8, in Claim 2, after "generating" insert -- the --.

In column 8, line 19, in Claim 4, after "wherein" delete "processing".

In column 8, line 61, in Claim 11, delete "relocation" and insert -- reallocation --, therefor.

In column 8, line 63, in Claim 11, after "have" delete ",".

In column 9, line 13, in Claim 14, before "communication" insert -- wireless --.

In column 9, line 52, in Claim 19, after "that is" delete "is".

In column 10, line 53, in Claim 27, after "warping" insert -- process --.

UNITED STATES PATENT AND TRADEMARK OFFICE
CERTIFICATE OF CORRECTION

PATENT NO. : 7,130,309 B2
APPLICATION NO. : 10/081307
DATED : October 31, 2006
INVENTOR(S) : Pianka It is certified that error appears in the above-identified patent and that said Letters Patent is hereby corrected as shown below:

In column 10, line 59, In Claim 28, after "of a" insert -- receiving --.

Signed and Sealed this

Twentieth Day of February, 2007

JON W. DUDAS
*Director of the United States Patent and Trademark Office*